United States Patent [19]
Göthberg et al.

[11] Patent Number: 5,593,235
[45] Date of Patent: Jan. 14, 1997

[54] ARRANGEMENT FOR ROLLER BEARINGS

[75] Inventors: Sven Göthberg; Hans Wendeberg, both of Frölunda, Sweden

[73] Assignee: Aktiebolaget SKF, Gothenburg, Sweden

[21] Appl. No.: 562,799

[22] Filed: Nov. 27, 1995

[30] Foreign Application Priority Data

Nov. 28, 1994 [SE] Sweden .................. 9404151

[51] Int. Cl.⁶ .................... F16C 43/00; F16C 35/06
[52] U.S. Cl. .................... 384/542; 384/546; 384/558; 384/585
[58] Field of Search .................... 384/495–498, 384/537, 542, 543, 546, 558, 559, 562, 584, 585, 586, 587

[56] References Cited

U.S. PATENT DOCUMENTS

| | | | |
|---|---|---|---|
| 3,427,081 | 2/1969 | Dellinger | 384/558 |
| 3,819,243 | 6/1974 | Asberg et al. | 384/542 |
| 4,352,528 | 10/1982 | Guimbretiere | 384/512 |
| 4,648,729 | 3/1987 | Jones | 384/615 |
| 5,174,661 | 12/1992 | Nicolas et al. | 384/585 X |
| 5,468,072 | 11/1995 | Ekdahl et al. | 384/448 |

FOREIGN PATENT DOCUMENTS

| | | |
|---|---|---|
| 561437 | 9/1993 | European Pat. Off. . |
| 0617208 | 9/1994 | European Pat. Off. . |
| 3014446 | 10/1980 | Germany . |

*Primary Examiner*—Thomas R. Hannon
*Attorney, Agent, or Firm*—Burns, Doane, Swecker & Mathis, L.L.P.

[57] ABSTRACT

A device for mounting rolling bearing assemblies of the type incorporating an outer race ring, an inner race ring and a plurality of rolling bodies provided between the rings, and where each ring in the assembled position is arranged to be nonmovably interconnected to an assembly element, involves one of the outer and inner race rings being equipped with an arrangement for fitting the race ring so that at least a portion of one of its side faces to a counter surface situated in a substantially radial plane. The race ring is securely attached to the corresponding assembly element or a detail firmly connected thereto.

17 Claims, 1 Drawing Sheet

ARRANGEMENT FOR ROLLER BEARINGS

FIELD OF THE INVENTION

The present invention relates to roller bearings and more particularly to an arrangement for mounting rolling bearing assemblies.

BACKGROUND OF THE INVENTION

In certain bearing applications of large size, it is desirable to support a tubular shaft having as large an inner opening as possible, i.e., a shaft having as small a material thickness as possible. This is desirable in the context of, for example, dewatering rolls in the paper and pulp making industry where it is desirable to suck water by means of a vacuum or by drainage from a wire part into the roll and to lead away the water through a tubular shaft journal connected to the roll. To obtain the biggest possible suction capacity, it is advantageous to utilize as big an internal tube diameter as possible. At the same time, from the standpoint of space and weight, it is desirable to avoid increasing the external diameter of the tubular shaft more than what is absolutely necessary.

Conventional applications, therefore, have used a tubular shaft having as thin a wall as possible taking into consideration the expected loads and stresses. On this shaft the inner race ring of the bearing is mounted on a taper sleeve or by heating the inner race ring or driving it up the shaft by aid of pressure oil. Due to the large dimensions of the inner race ring, such heating can hardly be effected in an oil bath, with electrical resistance heating or with other rational methods. Rather, the heating must be carried out manually with a gas torch or the like, i.e., in a rather non-rational manner. Driving or moving up the bearing inner race ring on a tubular taper shaft or on a taper adapter sleeve also involves other difficulties, not the least of which involves the large dimensions and the large weight of the components. Another big problem is of course when such bearings have to be exchanged. Here, the dismounting often may lead to deformation of the tubular, thin-walled shaft journal. A further serious problem with such bearing assemblies is that the bearing ring mounted on the tubular shaft has a tendency to come loose after an unacceptably short operation time. This results from the fact that the thin-walled, tubular shaft is subjected to deformation depending on the stresses to which the bearing assembly is subjected under operation.

Other applications where bearing assemblies of this type are employed include mills, tubular stone crushers and the like. In the case of tubular stone crushers, it is desirable to be able to feed stone lumps having dimensions as large as possible through the tubular shaft journal of the crusher casing. In such applications, the bearing assembly is generally subjected to bigger stresses, which further increase the risk for shaft deformation and early bearing failure.

Generally, the bearing assembly might be advantageous for all types of rotary drums where the sole purpose for the drum shaft is to constitute a seat for the bearing.

SUMMARY OF THE INVENTION

A need exists, therefore, for a device in rolling bearings of the type initially referred to, by means of which the problems mentioned above are eliminated or at least reduced to a substantial extent. It should be noted that it in some cases it might be desirable alternatively to use the device according to the invention for mounting an outer race ring of a bearing, and the device might also provide advantages in some applications having solid shafts.

In accordance with a preferred embodiment of the invention, an arrangement for supporting large radial loads about a relatively thin-walled tubular shaft includes a self aligning bearing positioned about the tubular shaft, with the bearing having an outer race ring, an inner race ring and a plurality of rolling bodies provided between the inner and outer race rings. The inner and outer race rings are connected to respective assembly elements, and an arrangement is provided for fitting the inner race ring with at least a portion of the side face of the inner race ring against a counter surface located in a substantially radial plane. The arrangement is such that the inner race ring is positioned without radially contacting the tubular shaft.

BRIEF DESCRIPTION OF THE DRAWING FIGURE

The foregoing features and advantages, in addition to others, will become more apparent from the following detailed description of the invention considered in conjunction with the accompanying drawing FIGURE which is a cross-sectional view of a portion of a dewatering roll on which is mounted a roller bearing in accordance with the present invention.

DETAILED DESCRIPTION OF THE INVENTION

Figure 1:
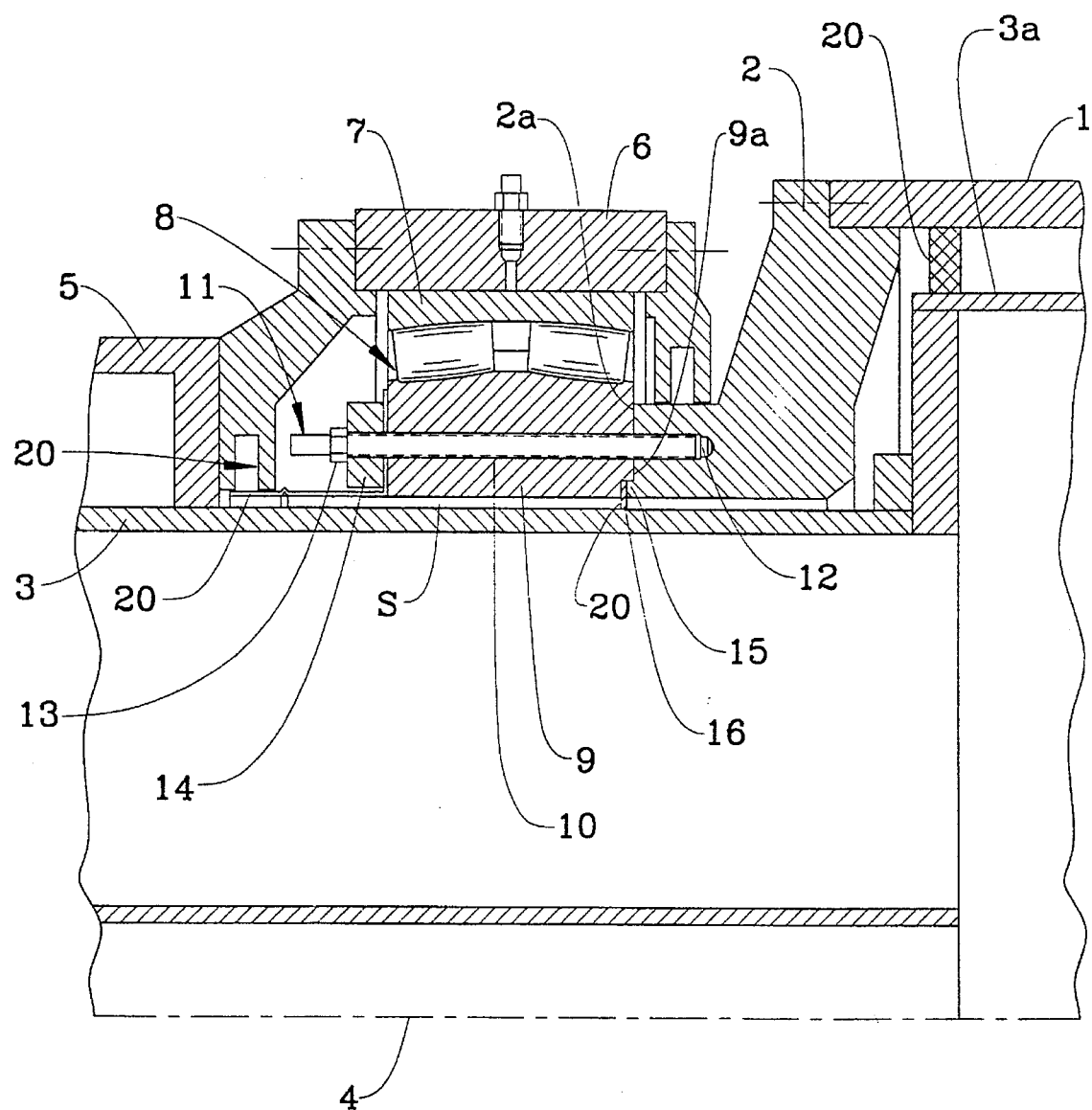

The drawing FIGURE shows a portion of a dewatering roll 1 equipped with a gable 2 connected to a non-rotary thin-walled, tubular shaft journal 3 supported by a supporting structure 3a. The roll 1 is rotatably supported about the center axis 4 of the tubular shaft in a bearing housing 6 supported by a frame 5. The bearing housing 6 in the embodiment shown supports the outer race ring 7 of a self-aligning double-row spherical roller bearing 8. As shown in the drawing FIGURE, a plurality of seals 20 are also provided.

The self-aligning double-row spherical roller bearing 8 includes an inner race ring 9 and an outer race ring 7. The inner race ring 9 of the bearing according to the invention is not mounted in a conventional manner on a taper sleeve or by the ring being driven up the shaft. Rather, in accordance with the present invention the inner race ring 9 is equipped with a series of axial through bores 10 spaced apart along the circumference of the inner race ring 9, preferably at mutually equal spaces or distances. The bores 10 are disposed substantially parallel to the axis 4 of the tubular shaft 3.

Through each of the bores 10 extends one bolt 11 having a threaded end. Each of the bolts 11 is tightenable in a correspondingly threaded blind bore 12 provided in the gable 2 of the roll in positions corresponding to the positions of the bores 10 in the bearing inner race ring 9. The inner race ring 9 and the outer race ring 7 are thus arranged to be nonmovably connected to respective assembly elements 1, 6.

The distance between the inner cylindrical surface of the bearing inner race ring 9 and the center axis for each bore 10 in the inner race ring is smaller than the distance between the bores 12 in the gable 2 and the outer envelope surface of the tubular shaft 3. Every bolt 11 is tightenable by means of a nut 13 against the side face of the bearing ring facing away from the gable 2, preferably via an intermediate thrust ring 14. Thus the bearing ring with its side face 9a facing the gable 2 engages a corresponding counter surface 2a of the gable. The counter surface 2a is situated in a substantially radially disposed plane.

As a result of the construction described above and illustrated in the drawing FIGURE, the inner race ring 9 is not in contact with the deformation sensitive tubular shaft 3, but is mounted with a play "s". Thus, the inner race ring 9 is spaced from the tubular shaft 3 and "hangs" in the gable 2 of the roll. In this manner the tubular shaft journal 3 can be made extremely thin-walled without the risk that the problems mentioned above will occur. Simultaneously, the gable 2 can be made rather thick so that it is able to support the bearing inner race ring via the bolts 12 without problems and without this interfering with the free internal space in the tubular shaft 3.

In the embodiment shown, the annular gable 2 at its inner circumference is provided with an axially projecting annular flange 15. In a corresponding manner the inner bearing race ring 9 has an annular recess 16 formed at its inner circumference. This recess 16 is located and shaped to be complementary to the annular flange 15. Due to the interaction between the annular flange 15 and the annular recess 16 in the inner race ring 9, the mounting of the bearing 8 in the correct position in relation to the gable 2 and the shaft 3 will be substantially facilitated. At the same time, a concentric guiding of the race track in relation to the envelope surface of the roll is achieved. As the envelope surface of the roll 1 and the envelope surface of the annular flange 15 are made tapering, it is furthermore possible to achieve alignment of bearings of very large dimensions, which is often necessary to ascertain that the bearing ring will not become non-round.

In the illustrated arrangement, the various parts of the structure are non-rotating except for the roll 1, the gable 2, the bearing inner race ring 9, the bolt 11, the nut 13, the thrust ring 14 and the generally L-shaped sealing member 20 clamped between the inner race ring 9 and the thrust ring 14.

Aside from the fact that a maximum internal entrance diameter can be achieved in various applications as a result of the present invention, the mounting of the bearing ring in the gable wall also allows realization of advantages relating to a considerably simpler mounting and dismounting of the bearing since the bearing during mounting must not be driven up. Furthermore, during fitting to a position wherein the bolts can be tightened, the bearing is guided by interacting recesses and projections in the cooperating portions.

It is to be recognized that the invention is not limited to mounting of the inner bearing race ring on a thin-walled shaft, but is also applicable for an inner bearing race ring mounted on a solid shaft and also for applications with the outer race ring affixed by means of a gable mounting.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the invention. Accordingly, it is expressly intended that all such variations, changes and equivalents falling within the spirit and scope of the present invention as defined in the claims be embraced thereby.

What is claimed is:

1. An arrangement for supporting large radial loads about a relatively thin-walled tubular shaft, comprising a self aligning bearing positioned about the tubular shaft, the bearing including an outer race ring, an inner race ring and a plurality of rolling bodies provided between the inner and outer race rings, the inner race ring having a side face, the inner and outer race rings being connected to respective assembly elements, means for fitting said inner race ring with at least a portion of the side face of the inner race ring against a counter surface located in a substantially radial plane, said inner race ring being positioned without radially contacting the tubular shaft.

2. A device according to claim 1, wherein the means for fitting said inner race ring includes at least one substantially axially arranged bore that receives a fitting element, said counter surface including a bore for receiving a portion of the fitting element.

3. A device according to claim 2, wherein said substantially axially arranged bore and said bore in the counter surface are spaced from the tubular shaft by a radial distance which provides radial play between the inner race ring and the tubular shaft.

4. A device according to claim 3, wherein one of said assembly elements is a roll having said counter structure.

5. A device according to claim 2, wherein the inner race ring includes means for fitting at least a portion of one side face of the inner race ring against an assembly element, said assembly element being provided with a surface having a portion that is complementary to the at least a portion of the one side face of the inner race ring to facilitate guiding during movement of the bearing.

6. A device according to claim 2, wherein said fitting element is a threaded screw that threadably engages the bore in the counter surface.

7. A device according to claim 1, wherein one of said assembly elements is a roll having a gable structure, said means for fitting including a fitting element positioned at least partially in a bore located in the gable structure.

8. A device according to claim 1, wherein said fitting means includes a bolt extending through an axially arranged through hole in the inner race ring, said bolt being screwed into a threaded blind bore provided in the counter surface.

9. A bearing mounting assembly, comprising a tubular shaft having an outer peripheral surface, a self aligning bearing positioned about the tubular shaft, the bearing including an outer race ring, an inner race ring and a plurality of rolling bodies provided between the inner and outer race rings, the inner race ring being stationarily positioned with respect to a first assembly element, the outer race ring being stationarily positioned with respect to a second assembly element, connecting means for connecting said inner race ring to the first assembly element so that the inner race ring is radially spaced from and out of contact with the outer peripheral surface of the tubular shaft to avoid deformation of the tubular shaft.

10. A bearing mounting assembly according to claim 9, wherein the connecting means includes a bore provided in the inner race ring which receives a threaded bolt.

11. A bearing mounting assembly according to claim 10, wherein the connecting means includes a bore in the first assembly element into which extends the threaded bolt.

12. A bearing mounting assembly according to claim 11, wherein the bore in the first assembly element is threaded for threadably receiving the threaded bolt.

13. A bearing mounting assembly according to claim 10, wherein said connecting means includes a nut which threadably receives the threaded bolt, said nut being located on a side of the inner race ring opposite the first assembly element.

14. A bearing mounting assembly according to claim 10, wherein said bore in the inner race ring is substantially parallel to the axis of the tubular shaft.

15. A bearing mounting assembly according to claim 9, wherein the first assembly element includes an annular flange which mates with a correspondingly shaped annular recess formed in one side of the inner race ring to facilitate guiding during movement of the bearing.

16. A bearing mounting assembly according to claim 9, wherein the inner race ring includes a side face which faces the first assembly element, the side face of the inner race ring engaging a counter surface of the first assembly element.

17. A bearing mounting assembly according to claim 9, wherein the first assembly element is a roll having a gable structure, said connecting means including a threaded fitting element positioned at least partially in a threaded bore located in the gable structure and extending into a bore in the inner race ring.

* * * * *